March 14, 1967

E. P. JOHNSON, JR 3,309,525

DOUBLE SHAFT ENCODER USING PHASE METER
TO INDICATE RELATIVE ROTATION

Filed June 9, 1964

INVENTOR.
EUGENE P. JOHNSON, JR.
BY
Weingarten, Ozenbuch & Lahive
ATTORNEYS

INVENTOR.
EUGENE P. JOHNSON, JR.
BY
Weingarten, Overbeck & Lahive
ATTORNEYS

March 14, 1967    E. P. JOHNSON, JR    3,309,525
DOUBLE SHAFT ENCODER USING PHASE METER
TO INDICATE RELATIVE ROTATION
Filed June 9, 1964    5 Sheets-Sheet 3

FIG. 4

INVENTOR.
EUGENE P. JOHNSON, JR.
BY
Weingarten, Orenbuch & Lahive
ATTORNEYS

March 14, 1967  E. P. JOHNSON, JR  3,309,525
DOUBLE SHAFT ENCODER USING PHASE METER
TO INDICATE RELATIVE ROTATION
Filed June 9, 1964  5 Sheets-Sheet 5

FIG. 6

BY
Weingarten, Orenbuch & LaHive
ATTORNEYS

United States Patent Office 3,309,525
Patented Mar. 14, 1967

3,309,525
DOUBLE SHAFT ENCODER USING PHASE METER TO INDICATE RELATIVE ROTATION
Eugene P. Johnson, Jr., Woburn, Mass., assignor to Dynamics Research Corporation, Stoneham, Mass., a corporation of Massachusetts
Filed June 9, 1964, Ser. No. 373,817
8 Claims. (Cl. 250—231)

This invention relates in general to electromechanical transducers and more particularly to a position transducer presenting a highly accurate output indication of the amount of rotation of a shaft with respect to a fixed reference.

Electromechanical transducers for providing an output indication of the amount of rotation of a shaft, also commonly referred to as shaft angle encoders, find a wide variety of applications, particularly in general positional devices, such as inertial navigation equipment and the like. The requirements for such devices are becoming increasingly stringent in terms of size, reliability and accuracy. One type of encoder which has been used employs a pair of discs, each having a series of alternately light transmissive and opaque sectors disposed about their circumference. One of the discs is mounted on the shaft whose rotation is to be determined while the second disc is mounted concentric with the shaft but mechanically fixed to a reference point. Rotation of the shaft then occasions modulation of a light beam passed through both discs to a photosensitive sensor. The electrical waveform at the output of the sensor is then indicative of the amount of shaft rotation. Such a device is described in U.S. Patent No. 3,096,444, issued on July 2, 1963.

One limitation on the accuracy of devices such as that described immediately above and other similar devices is the accuracy with which the sectors may be laid out on the discs. This limitation is particularly critical in applications where the diameter of the encoder must be kept small. An additional source of errors in encoders of this general type arises from eccentricity in the mounting of the discs. This error is similar to the above-described errors arising from the lack of precision of layout of the sectors. Various techniques have been evolved to improve the accuracy with which the sectors may be placed, to compensate for eccentricity or "run-out" errors and to interpolate between sector divisions. Techniques of this type are described in U.S. Patent No. 2,930,895, issued Mar. 29, 1960; U.S. Patent No. 2,961,917, issued Nov. 29, 1960; and U.S. Patent No. 3,244,895.

It is, therefore, a primary object of the present invention to provide a small diameter electromechanical transducer which produces an extremely precise electrical signal indicative of the amount of rotation of a shaft.

It is another object of the present invention to provide an electromechanical shaft encoder which includes light modulating discs and in which the precision of measurement of the rotation of the shaft exceeds the precision of the pattern of sectors on the modulating discs.

It is still another object of the present invention to provide a shaft encoder which provides a precise indication of the rotational position of a shaft and which compensates for inaccuracies in placement of sectors and for eccentricity of mounting.

Broadly speaking, the transducer of the present invention includes a pair of shaft encoders, each encoder having a rotor and a stator element. The rotor elements of each of the encoders are coupled together and rotated at a constant speed by a constant speed motor. The stator of one of the encoders is mechanically fixed at a mechanical reference point while the stator of the second encoder is mounted on the shaft, the rotational position of which is to be indicated. Each of the encoders has mounted on its respective stator a light source and photosensitive receiver arranged so that the stator and rotor elements of each encoder are interposed between its light source and light receiver. The rotor and stator elements have a pattern of alternately light transmissive and light opaque sectors arranged such that rotation of the rotor of each encoder modulates the light transmitted from the light source to the light receiver associated with that encoder. Each one of the light sensitive receivers then provides an electrical output having a waveform which varies with rotation of the respective rotor and these electrical outputs are coupled to a phase meter which generates as an output, a signal indicative of the average difference in phase between the electrical outputs from the two light sensitive receivers averaged over one complete revolution of the rotors. This output signal from the phase meter is then indicative of the rotation of one stator with respect to the other and has an accuracy of measurement which exceeds the precision with which the alternately light transmissive and opaque sectors have been laid out on the respective discs. Other objects and advantages will become apparent from the following detailed description when taken in conjunction with the accompanying drawing in which:

Figure 1:
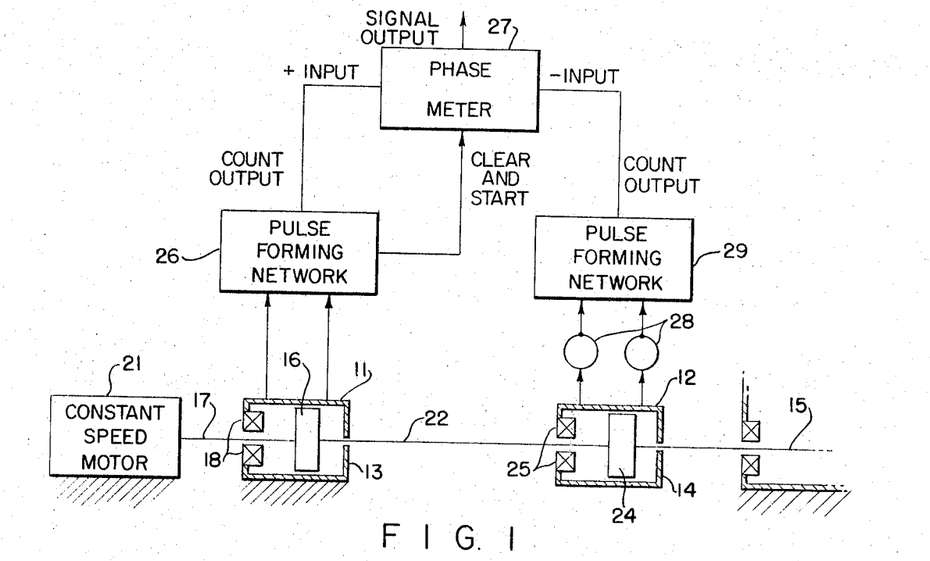
FIG. 1 is an illustration partially in block diagrammatic and partially in schematic form of an electromechanical transducer in accordance with the principles of this invention.

With reference now specifically to FIG. 1, a pair of shaft encoders 11 and 12 are shown with the stator 13 of reference encoder 11 mechanically fastened to a fixed reference point. The stator 14 of the input encoder 12 is mechanically mounted on a shaft 15. The entire transducer provides an output signal which indicates the amount of rotation of the shaft 15 with respect to the fixed reference point. The rotor 16 of reference encoder 11 is mechanically connected to shaft 17 to a constant speed motor 21. The shaft 17 is mechanically supported by bearings 18 on stator 13. Rotor 16 is also coupled by shaft 22 to the rotor 24 of input encoder 12 and the shaft 22 is supported by bearings 25 on the stator 14. The arrangement is such that the constant speed motor rotates rotor 16 and rotor 24 at a constant velocity with respect to the fixed mechanical reference point. Each of the encoders 11 and 12 provides output waveforms as their respective rotors are rotated with respect to the stators. The exact manner in which these waveforms are generated and the relationship between them and the amount of rotation of the rotor will be explained in more detail below.

Waveforms from the encoder 11 are provided to pulse forming network 26 which in turn generates a pulse for each zero crossing of the waveform. This series of pulses appears on the count output which is, in turn, connected to the positive input of phase meter 27. A clear and start input to phase meter 27 is received from an output from pulse forming network 26 which indicates a zero reference position on rotor 16. In a similar fashion the waveforms from encoder 12 are connected through slip rings 28 to a similar pulse forming network 29 which in turn provides a count output of shaped pulses to the minus input of phase meter 27. The slip rings 28 are required since the stator element 14 of encoder 12 may rotate with respect to the fixed mechanical reference point. The phase meter 27 provides a signal output which indicates the average difference in phase for each revolution of the rotors, between signals from encoder 11 and encoder 12. This average phase difference is itself a direct indication of the amount of rotation of the input shaft with respect to the mechanical reference point.

Figure 2:
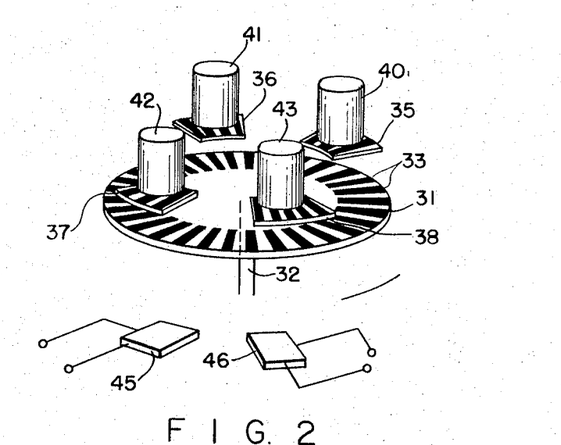
FIG. 2 is an illustration in perspective view of a portion of a transducer constructed in accordance with the principles of this invention.

Turning now to FIG. 2, there is illustrated a portion of an encoder of a type suitable for use in the system of FIG. 1. A rotor element 31 is mounted on a shaft 32 and rotates with rotation of the shaft 32. The rotor element 31 has a pattern of alternating light transmissive and opaque sectors 33 running circumferentially around its perimeter.

The stator of the encoder shown in FIG. 2 includes four segments, 35, 36, 37, and 38. Each one of the segments forming the stator is a replica of a segment of the rotor element 31 and each of the segments is mounted coaxially with respect to the rotor element 31. Associated with each of the segments of the stator is a light source and light sensor arranged such that light from the light source passes through the respective stator segment through the rotor 31 and onto the sensor. Thus, the light sources 40, 41, 42, and 43 are associated with stator segments 35, 36, 37, and 38, respectively. The light sensors associated with stator segments 37 and 38 are sensor elements 45 and 46, respectively. The sensor elements may typically be formed of a photocell such as large area silicon cells. The light sensors for segments 35 and 36 are not shown.

At any individual cell the light being received from the corresponding light source will be modulated as the rotor element 31 rotates. One complete revolution of the shaft 32 will produce a light modulation having a number of periods equal to the number of pairs of opaque and transmissive sectors on the rotor element 31. In a preferred form of this type of encoder, stator segments are arranged in electrically connected pairs on the same diameter, as for example, segments 36 and 38. The stator segments are set with respect to each other so that the electrical waveforms from the corresponding sensor elements are 180° out of phase. In this arrangement, then, the combined output waveform from the two photocells of each pair of segments is an alternating current waveform vs. shaft angle varying about an average D.C. value of zero. The second pair of stator segments and their respective light sources and sensor cells are disposed again on a diameter, with this diameter however placed 90° from the diameter of the first pair of photocells and the individual segments on the stator arranged with respect to the first pair of segments such that the electrical waveforms produced by this second pair of segments is 90° out of phase with the electrical waveform from the combined first pair of segments. Conventional circuitry can be arranged so that, for each zero crossing of each of the waveforms an output pulse is provided. Therefore, for a system having four segments disposed as indicated in FIG. 2, the total number of pulses is four times the total number of pairs of transparent and opaque sectors on the rotor element 31.

While the mounting detail for the rotor, stator, photocells, and light sources has not been shown in FIG. 2, it should be apparent that with the exception of rotor 31 and shaft 32 all of the remaining elements are mechanically fixed to a common member which includes a suitable mounting surface so that there is no relative motion between them. Thus, with this type of arrangement, the problem of a movable electrical connection internally with the encoder is not present since the only moving element, the rotor, does not carry any electrical receivers or light generators. As discussed previously, slip ring connections between the encoder 12 and the remainder of the circuitry are required since that entire encoder is movable with respect to the encoder 11 and the fixed mechanical reference point, to which generally the circuitry is also affixed.

In order that the waveform outputs from each of the encoders 11 and 12 may have their phases compared over a period of one revolution of the rotor elements, it is necessary to provide an indication of a zero reference on the rotors. There are several conventional ways of accomplishing this. A suitable method is described in copending U.S. application Ser. No. 306,008, filed Sept. 3, 1963.

Figure 3:
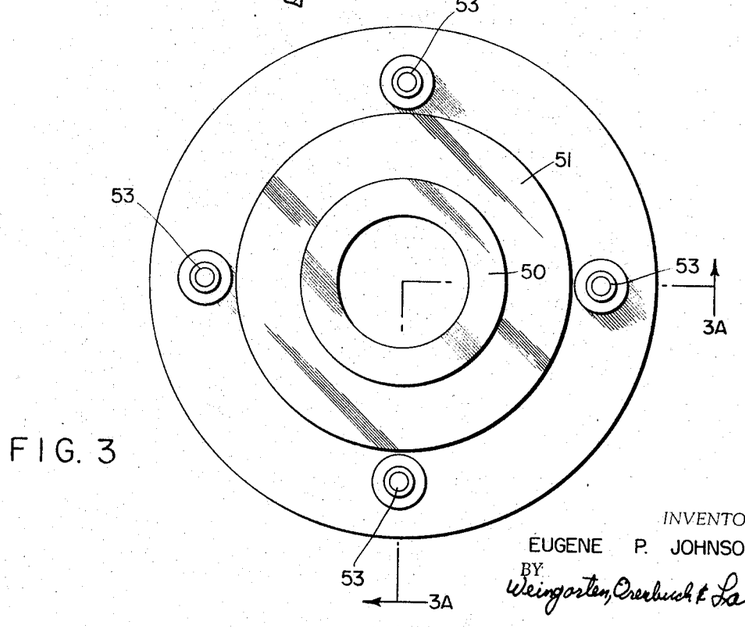
FIG. 3 is a top view of a shaft encoder constructed in accordance with the principles of this invention.
Figure 3A:
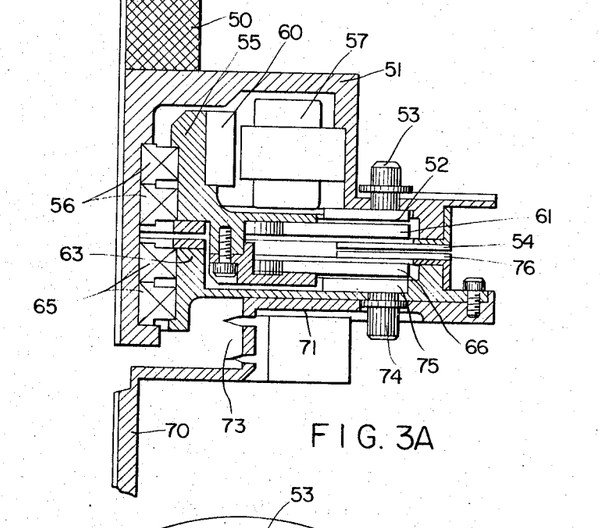
FIG. 3A is a cross-sectional view taken along line A—A of FIG. 3.

Referring now to FIGS. 3 and 3A, there is shown a structural embodiment of a shaft position transducer in accordance with the principles of this invention. FIG. 3 is a top view of the transducer while FIG. 3A is a cross-sectional view taken along the line A—A of FIG. 3. It will be noted that the cross-sectional view of FIG. 3A is taken along a line which includes only one-half of the transducer. However, since the transducer is completely symmetrical, the remaining half, which is not shown, will be precisely the same as that which is shown.

Attached to a mounting block 50 is a reference stator element 51 on which is mounted a lamp 53 and a sectored stator disc 52. As described above in connection with FIG. 2, the disc 52 may actually be a segment of a disc and need not extend around the entire periphery of the apparatus. A photosensitive element 54 is also attached to the reference stator element 51. The photosensitive element 54 may typically be formed of a large area silicon cell. Associated with the stator element 51 is a rotor element 55 which is supported on stator element 51 by means of bearings 56 which permit the rotor element 55 to rotate with respect to the reference stator element 51. Also mounted on stator element 51 is the stator 58 of a constant speed motor 57, and the rotor 60 of this motor is attached to the rotor element 55. This rotor element 55 carries on it a rotor disc 61 which is marked with a pattern of alternately light transmissive and light opaque sectors as shown in FIG. 2. This rotor disc 61 is arranged with respect to the stator disc 52 so that the pair of discs intercept light being transmitted from the stator lamp 53 to the photosensitive element 54.

A second rotor element 63 is attached and mechanically fixed to the first rotor element 55 and this second rotor element 63 is also supported by means of bearings 56. This second rotor element 63 also carries on it rotor disc 66 identical with the rotor disc 61 attached to rotor 55.

Attached to the input shaft 70, the rotational position of which is to be measured, is an input stator element 71. This input stator element 71 is shown connected to the shaft via a flexible coupling 73 which allows linear flexibility but maintains a fixed rotational position between the input shaft 70 and the input stator element 71. This flexible coupling 73 provides for some tolerance in linear alignment between the input shaft 70 and the mechanical mounting element 50 and yet provides for precision of rotational measurement. The input stator element 71 carries a lamp 74 and a disc element 75. As in the case of the fixed reference stator 51, the disc element 75 may be formed of a segment of a disc. Also mounted to the input stator element 71 is an input stator photosensitive element 76, which again would typically be a large area silicon cell. The input stator element 71 is supported by bearings 65 on reference stator element 51.

In operation, then, the rotor 60 of the constant speed motor 57 drives the pair of rotor elements 55 and 63 at a constant speed with reference to the mechanical mounting 50 and therefore to the stator element 51. The rotation of these rotor elements and hence of the rotor discs carried by them, with respect to the stator discs 52 and 75, modulates the light passing from their respective lamps to their respective photosensitive elements providing, as previously indicated, an optical waveform having, for each 360° revolution of the rotor elements, a number of periods equal to the number of pairs of opaque and transparent sectors on the rotor discs. The photosensitive elements 54 and 76 provide an electrical output waveform which reproduces the waveforms of the light incident on the surface of each photosensitive element. These electrical waveforms are carried by electrical connections (not shown) to output circuitry, which therefore provides an indication of the amount of rotation of the input shaft 70 with respect to the fixed reference point 50.

It should be pointed out that there are several significant advantages to a configuration similar to that shown in FIGS. 3 and 3A. Thus, as will be described in detail below, the accuracy of this position transducer is significantly enhanced over that which could be achieved using a single encoder including only one rotor and one stator. However, the diameter of the entire encoder is no greater than that which is required for a single encoder. Again, since all of the patterned discs are of substantially identical diameter then no problem arises as to variation in accuracy of patterns which can be achieved from the greater or smaller diameters. A further advantage is achieved since the rotors which are driven at relatively high speed contain neither lamps nor photocells and hence require no electrical connections whatever.

As stated previously, the accuracy of a transducer utilizing a pair of constant speed-driven rotors and an input stator and a reference stator is better than the accuracy obtainable using only one rotor and one stator to form the encoder. Two of the chief sources of errors are inaccuracy in the pattern of alternately opaque and transparent sectors and bearing runout. Considering an encoder having N pairs of alternately opaque and transparent sectors, one pair of diametrically opposed sensors, and in which the circuitry is arranged to provide for a pulse for each zero crossing of the electrical waveform, then, for a complete revolution of the rotor, 2N pulses are obtained. If now the bearing characteristics are stationary over a longer time than that required for one revolution of the rotor element, the $(2N+1)$th pulse occurs at precisely the same shaft angle as the first pulse, irrespective of what pulse was selected as the first pulse.

If the rotor shaft turns at a very accurately regulated speed of one revolution per second, then the average pulse frequency is 2N pulses per second. If any pulse at all is selected as the time reference $t=0$, then the $k$th pulse arrives at $$t_k = \frac{k}{2N} + e_k$$

(sec). $k/2N$ is the time when the $k$th pulse will occur if the encoder is perfect. The error $e_k$ occurs because the encoder is imperfect. However, as noted above, this error closes once per cycle, that is, after one complete revolution of the rotor disc the next pulse occurs precisely on time. Since this is true, then the following relations exist:

$$e_{2N} = 0$$

and $$t_{2N} = 1 \text{ (sec)}$$

Thus, while there may be an error $e_k$ at any intermediate position of the rotor element, for a complete rotation of the rotor element the error term closes to zero.

In discussing the errors of the encoder system as shown in FIG. 1 the reference encoder will be referred to as encoder A and the input encoder as encoder B. It should also be noted that each encoder has, as illustrated in FIG. 2, two channels and therefore the total number of pulses from each encoder for each rotation of the rotor is 4N pulses.

Encoder A puts out its $k$th pulse at time $$t_{Ak} = \frac{k}{4N} + e_{Ak}$$

Encoder B puts out its $k$th pulse at $$t_{Bk} = \frac{k}{4N} + e_{Bk}$$

In general $$e_{Ak} \neq e_{Bk}, \text{ but } e_{A4N} = e_{B4N} = 0$$

Now if both stators are kept in a fixed position and if pulses from encoder A are used to switch a D.C. level from 0 to a positive voltage and pulses from encoder B are used to switch the D.C. level from 0 to an equal negative voltage then the average value of the resultant waveform is $$\frac{\phi}{360°} = \sum_{k=1}^{4N}(t_{Ak} - t_{Bk}) + \sum_{k=1}^{4N}\left(\frac{k}{4N} + e_{Ak}\right) - \left(\frac{k}{4N} + e_{Bk}\right)$$
$$= \overline{e_A} - \overline{e_B}$$

where $\phi$ is the phase angle and $\overline{e_A}$ and $\overline{e_B}$ are the average errors of the two encoders, defined as $$\overline{e_A} = \sum_{k=1}^{4N} e_{Ak} \text{ and } \overline{e_B} = \sum_{k=1}^{4N} e_{Bk}$$

Now if the stator of the B encoder is rotated backward through an angle $$\alpha = \frac{1}{2\pi}\left[\frac{m}{4N} + \beta\right] \text{(radians)}$$

where $$0 < \beta \leq \frac{1}{4N}$$

and where $m$ is an integer, and the stator of encoder B is clamped at this position then the $k$th pulse from A occurs at the same time as before but the $k$th pulse from B occurs at $$t_{Bk} = \left(\frac{k+m}{4m} + e_{B(k+m)}\right) - \left(\frac{m}{4N} + \beta\right)$$
$$= \frac{k}{4N} + e_{B(k+m)} - \beta$$

Figure 5:
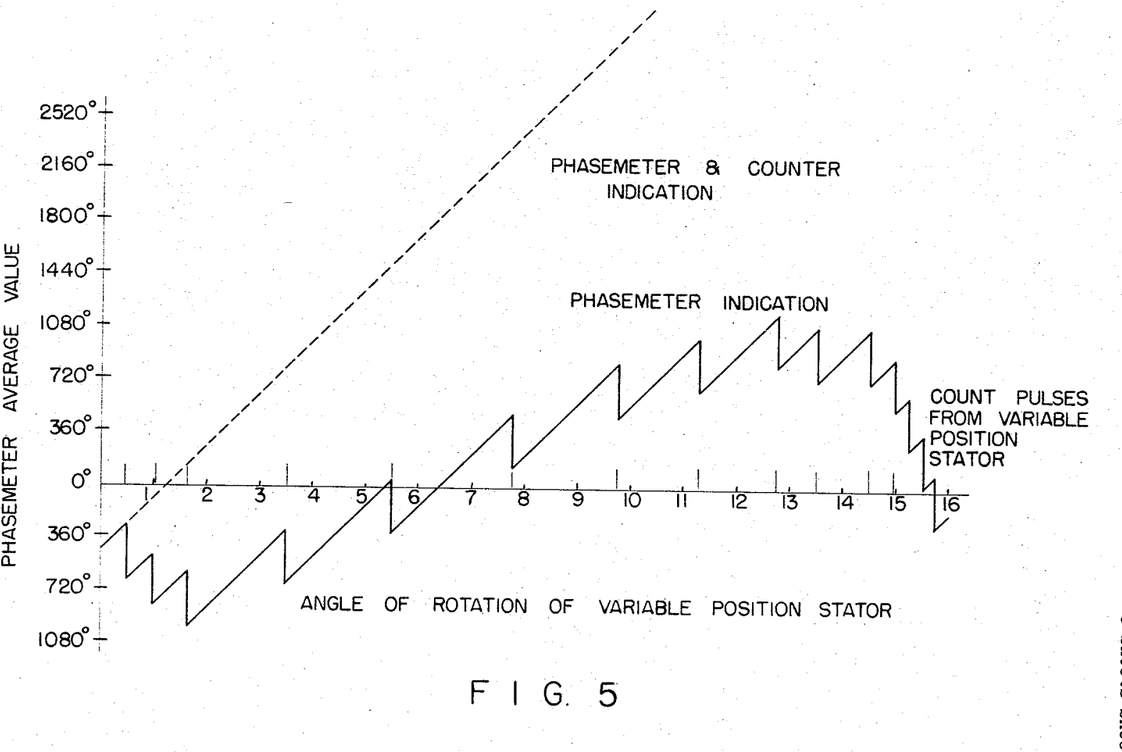
FIG. 5 is a plot of output signal characteristics of an electromechanical transducer constructed in accordance with the principles of this invention.

If now the pulse trains are applied to a phasemeter the result is $$\frac{\phi}{360°} = \sum_{k=1}^{4N}(t_{Ak} - t_{Bk})$$
$$= \sum_{k=1}^{4N}\left[\frac{k}{4N} + e_{Ak} - \left(\frac{k}{4N} + e_{B(k+m)} - \beta\right)\right]$$
$$= \overline{e_A} - \overline{e_B} - 4N\beta$$

or $$\phi = -360°(4N\beta) + 360°(\overline{e_A} - \overline{e_B})$$

since $\beta$ can vary from 0 to $\frac{1}{4}N$ then $\phi$ varies from $360°(\overline{e_A} - \overline{e_B})$ to $360°(\overline{e_A} - \overline{e_B}) - 360°$. From this analysis it can be seen that the output waveform will be constituted of a series of ramps and steps as is illustrated in FIG. 5.

Thus, the apparatus is capable of measuring exact $\frac{1}{4}N$ increments of angular revolutions and also submultiples of this increment with an accuracy limited only by change with time of the pulse to pulse spacings from each of the photocell circuits where these changes in pulse to pulse spacing take place at a rate substantially faster than the revolution speed of the driven rotors. The accuracy gain of this system over a single rotor-stator arrangement is then related to the ratio of the shaft rotation to the drift rate of pulse to pulse spacing. This ratio is expected to be very large, for example, 100 to 1 or 1000 to 1. If the average pulse-to-pulse errors of each pair of stators and rotors remain constant with time then the overall apparatus averages out these errors. In addition to the gain in accuracy, a gain in resolution is encountered also since the phase meter readings can be interpolated to provide for resolution finer than ¼N revolution.

The transducer described and shown in FIG. 1 yields a signal output which indicates the angular position of the input shaft relative to the fixed mechanical reference. However, the apparatus, as shown, is limited to a relatively small range, since the phase meter range would usually be limited to a few counts. An apparatus, then, as shown in FIG. 1 does not provide an absolute encoder in the sense that a reading of its output at a specific point in time is indicative of the angular position of the input shaft with respect to a fixed mechanical reference point. This can readily be seen by reference to FIG. 5 which includes, for a hpyothetical 16-count encoder, a graphical representation of the phase meter average value as a function of the angle of rotation of the variable position stator (input shaft). Referring in FIG. 5 to the plot of phase meter output indication, it can be seen that the specific value of the phase meter average value is ambiguous as to the rotation position. In many instances there are four or five different values of rotation angle which yield the same phase meter output indication. The output from the phase meter comprises a series of ramps and negative steps with the negative steps occurring at the same point in time as the count pulses from the variable position stator. If, however, each count pulse from the variation position stator is added to the phase meter output in such a way as to provide an equivalent of a 360° value, then the output of the transducer as a function of variable position stator angle is that shown in the dotted line on FIG. 5 and is seen to be a completely unambiguous indication of rotational angle. Thus, if at any given moment of time, the average value of the phase meter output for one complete revolution of the rotors and the number of counts accumulated from the variable position stator for this same period of time is determined, an unambiguous and accurate measurement of the angular position of the input shaft has been accomplished.

Figure 4:
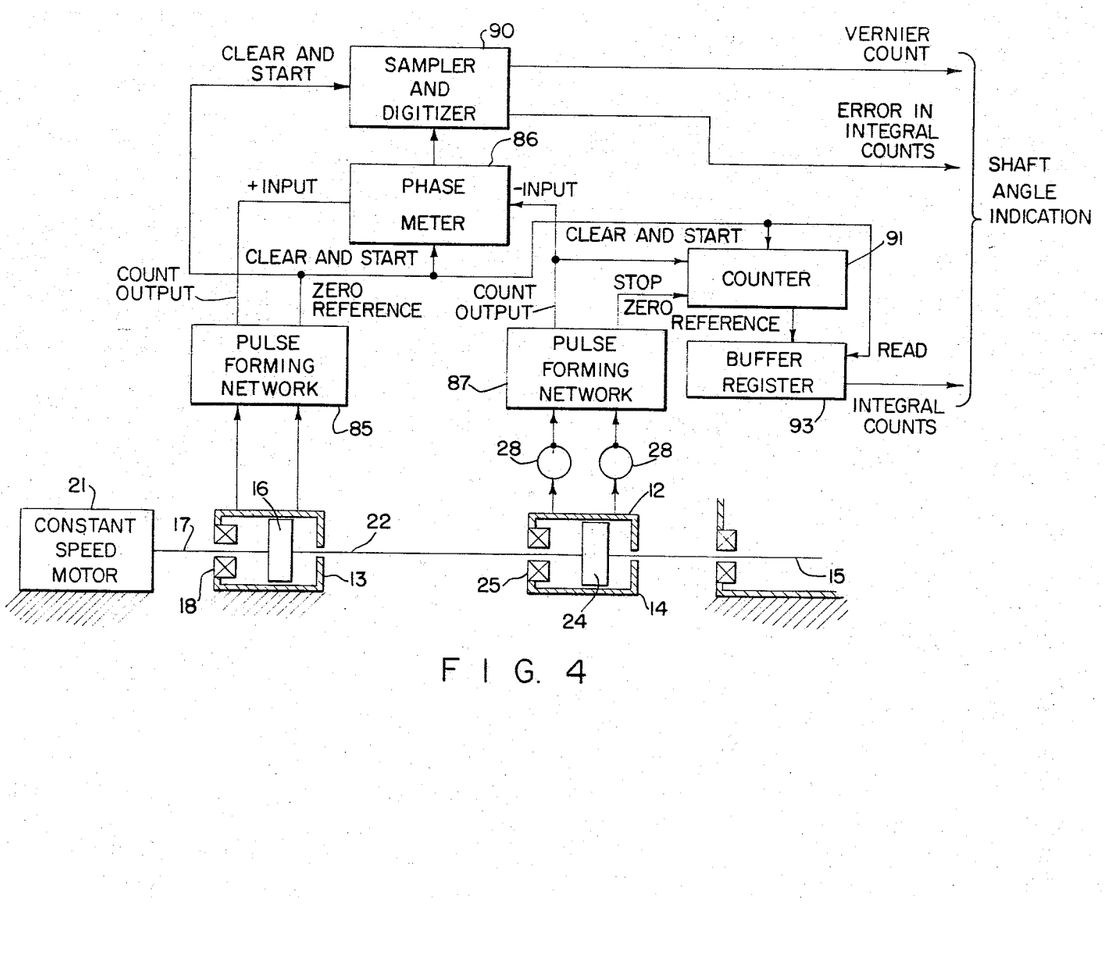
FIG. 4 is an illustration partially in block diagrammatic and partially in schematic form of another embodiment of electromechanical transducer constructed in accordance with the principles of this invention.

Referring now to FIG. 4, an apparatus is shown in block diagrammatic form which provides an absolute output indication of the type described immediately above. The basic encoder arrangement is identical with that shown in FIG. 1 and like numbers have been used for like parts. The circuitry arrangement for the absolute encoder, is however more complex than that shown for the incremental transducer described with reference to FIG. 1. The waveforms from the encoder 11 are connected to a pulse forming network 85, which again generates a pair of pulses for each complete cycle of the waveform, with the pulses being provided at the zero crossings of the waveform. These pulses which are designated "count" output are connected to the plus input of phase meter 86. The waveforms from the input encoder 12 are connected through the slip rings 28 to a second pulse forming network 87. The pulse forming network 87 is a duplicate of pulse frming network 85 and provides on a count output two pulses for each complete cycle of the waveform from encoder 12. This count output from the pulse forming network 87 is provided to the minus input of phase meter 86. Each of the pulse forming networks 85 and 87 provide an additional output indicated as the zero reference output. The zero reference output carries a pulse once for each complete revolution of the rotor of the respective encoder. This pulse indicates a specific point on each of the rotor discs.

The output of phase meter 86 is coupled to a sampler and digitizer unit 90. The sampler and digitizer unit 90 also receives an input from the zero reference output of pulse forming network 85 and accordingly this input to the sampler and digitizer unit 90 receives a pulse once for each complete revolution of the rotor of the reference encoder 11. The function of the sampler and digitizer unit 90 is to provide a digital output representing the average value from the phase meter for each complete revolution of the rotor 16 of the reference encoder 11. Thus, the zero reference pulse from pulse forming network 85 provides a signal which essentially resets the sampler and digitizer unit once per revolution. The sampler and digitizer, it should be noted, provides two outputs. One output is the vernier count, which is a digital interpolation of the angular position of the input shaft with respect to the mechanical reference point for amounts less than a full count division, that is, amounts less than ¼N of 360°. In addition, the sampler and digitizer unit 90 provides a second digital output which is labeled "error in integral counts." This second output is required since the error in the accuracy of the patterns and hence the output of the phase meter may actually achieve a value in excess of ½ a sector or 1 count of the pulse train output and hence this value should be added to the straight count output from the input encoder. The sum of these two signals is equivalent to a sample of the curve shown in FIG. 5. Its value thus depends on the angle of shaft 15 relative to the mechanical reference point.

The count output pulses from the pulse forming network 87, in addition to being applied to the negative input of phase meter 86, are also applied to the input of a counter 91. The counter 91 receives its Clear and Start signal from the zero reference pulse from the other pulse forming network 85 and receives its stop pulse from the zero reference output from pulse forming network 87. Thus, the counter contents of counter 91 are the number of count output pulses from pulse forming network 87 (and hence from the input encoder 12) received between the zero reference pulse from reference encoder 11 and the zero reference pulse from input encoder 12. The accumulated count in counter 91 is transferred into buffer register 93 upon receipt of a read signal at buffer register 93. This read signal is received from the zero reference output of pulse forming network 85. The output of buffer register 93 provides the integral count output from the entire transducer. Thus, three distinct outputs are provided from this absolute encoder, one being the integral counts from buffer register 93; a second being the error in integral counts which comes from the sampler and digitizer 90; and the third being the vernier count output which also comes from the sampler and digitizer 90. These three outputs then are generated once for each complete revolution of the rotors of the transducer and the sum of the values presented at these three outputs is an accurate and totally non-ambiguous indication of the angular position of the input shaft 15 with respect to the mechanical reference point.

The phase meter which is required for both the apparatus shown and described with reference to FIG. 4 and that shown and described with reference to FIG. 1 is somewhat more complex than a flip-flop circuit keyed by the two pulse trains, if in fact the instantaneous error ever exceeds a single unit count. In addition, the waveform of the phase meter must also be averaged. And further, the average value of this waveform must be measured for a period which corresponds to a complete rotation of the rotors. Finally, it is desirable to render the output of the phase meter in digital form. As has been previously discussed, in order to obtain the advantages of the accuracy and resolution gain of the encoder described herein, the velocity at which the rotors rotate must be held constant with time. Another condition which is required, is that the total time required for a complete revolution of the rotors is sufficiently small so that the angular position of the input shaft is effectively stationary during the period of a revolution of the rotors.

The effect of a lack of constant velocity of the rotors can be compensated if the motor driving the rotors and the time base provided for averaging the output of the phase meter are both referenced to the same frequency source. Thus, drift in this frequency source would effect both the rotor speed and the time base in the same fashion.

Figure 6:
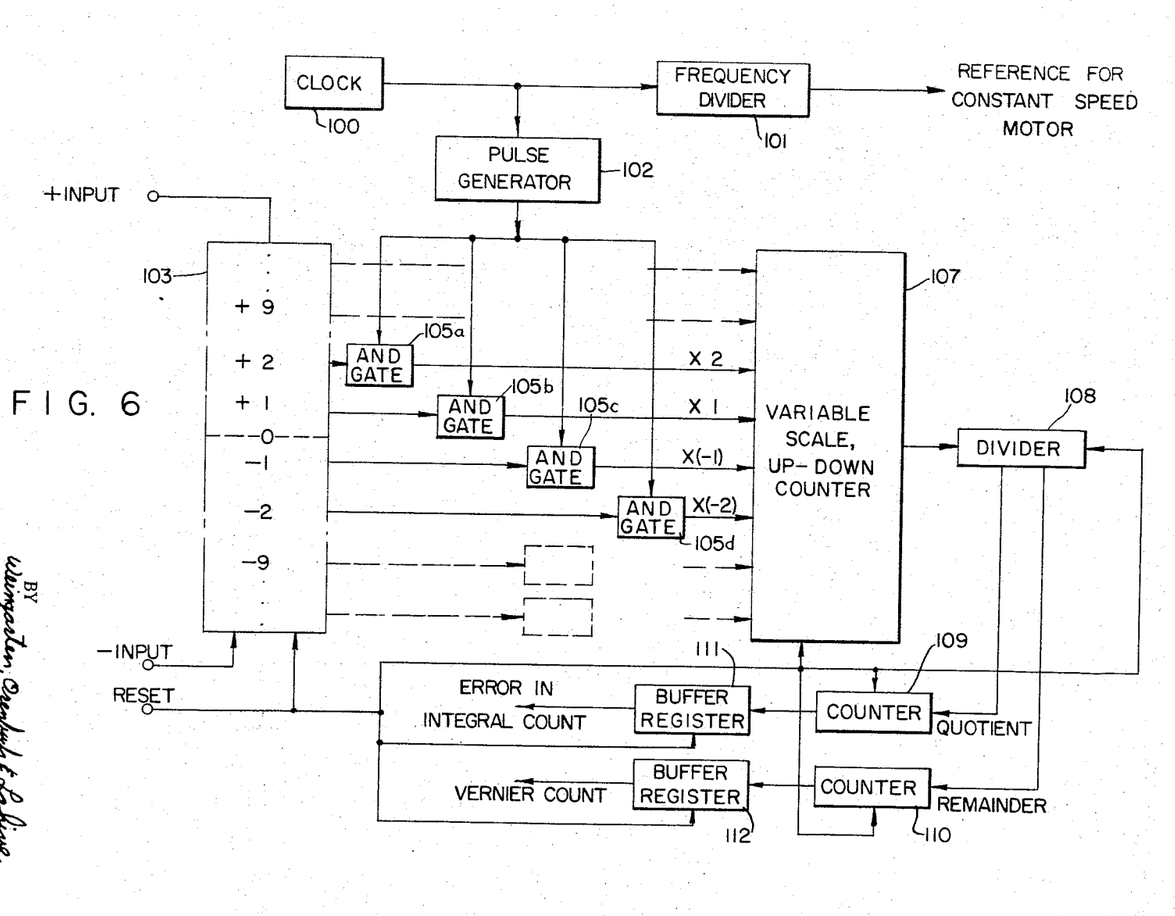
FIG. 6 is an illustration in block diagrammatic form of a digital phase meter which may form a portion of a preferred embodiment of a transducer constructed in accordance with the principles of this invention.

Referring now to FIG. 6 a phase meter is shown in block diagrammatic form. The phase meter shown in FIG. 6 is suitable for use as the phase meter in the transducers shown in FIGS. 1 and 4. The phase meter shown is seen to have a time base provided by a clock 100 which provides a reference for both a frequency divider 101 and a pulse generator 102. The output of the frequency divider 101 is provided as an input reference for a constant speed motor 21, which in turn drives the rotors of both the input and the reference encoders (11 and 12 in FIG. 4). The positive pulse input and the negative pulse input to the phase meter from the reference and input encoders respectively are connected directly to an up-down counter 103. The up-down counter 103 is a conventional counter which can accumulate pulses algebraically. Thus, pulses on the positive input accumulate counts in one direction, while pulses on the minus input accumulate pulses in the opposite direction. The reset pulse, however, resets the counter to essentially a middle position which is designated as zero. The up-down counter 103 has a series of output leads, each connected to one count position in the counter. On each of the output leads is one of the series of AND gates shown as 105A, 105B, 105C, 105D. The second input leg of each of the AND gates 105A, 105B, 105C, and 105D is provided from pulse generator 102. Each of these gates also has an output lead which is connected to a variable scale up-down counter 107. Each of these leads is connected such that if one count output lead, for example, the +2 lead from up-down counter 103 is activated, then the input leg of only one AND gate (105A) in this example gate is activated. When the pulse generator 102 then generates an output pulse, the AND gate 105A connects this output pulse to the X2 input of the variable scale up-down counter 107. The operation then is that for each pulse from pulse generator 102 a different weighted count is applied to the variable scale up-down counter 107, depending on the activated output level from the up-down counter 103.

The output from the variable scale up-down counter 107 is connected through a divider 108 to a pair of counters 109 and 110. The divider 108 divides the output of the up-down counter 107 by a factor equal to the ratio of clock pulse frequency to the encoder pulse frequency. The quotient of this divided count is then provided to counter 109, the output of which is connected through a buffer register 111 to the "error in integral count" output. The remainder of this divided count is coupled to counter 110, the output of which is connected through buffer register 112 to the vernier count output.

Each of the units which have not been specifically described in the phase meter shown in FIG. 6 are conventional computer-type logic circuitry. There are a variety of ways of arranging the variable scale up-down counter 107, which is perhaps the least common of the units. Thus, each of the positive inputs may, for example, be coupled through individual pulse multipliers which, when activated, provide a discrete number of pulses to the positive-going input of the up-down counter 107 and similarly the negative inputs may be provided through identical multipliers to the negative input of the up-down counter. With an arrangement of the phase meter as shown and described with reference to FIG. 6, the variations in the clock pulse phase effect equally both the motor speed driving the rotors and the time basis of averaging, and hence the effect is one of a constant speed motor.

The invention having been described, various modifications and improvements will become apparent to those skilled in the art, and the invention should be construed as limited only by the spirit and scope of the appended claims.

What is claimed is:

1. An electromechanical transducer comprising first and second rotor elements, each of said rotor elements having a plurality of alternately light transmissive and non-transmissive sectors disposed circumferentially thereon; a stationary element in close juxtaposition to said first rotor element; an input element in close juxtaposition to said second rotor element, said input element being relatively rotatable with respect to said stationary element; drive means for rotating said first and second rotor elements at substantially constant angular velocity with respect to said stationary element; a first light source fixed to said stationary element on one side of said first rotor element and projecting light onto said first rotor element; a first light sensor mounted on said stationary element on the opposite side of said first rotor element and in a position to receive light from said first light source which is transmitted through said first rotor element; means fixed to said stationary element in the region of said first light source and said first light sensor for modulating light from said first light source such that the amount of light received by said first sensor varies in accordance with the angular position of said first rotor element; a second light source fixed to said input element on one side of said second rotor element and projecting light onto said second rotor element; a second light sensor mounted on said input element on the opposite side of said second rotor element from said second light source in the position to receive light from said second light source transmitted through said second rotor element; second modulating means mounted on said input element in the region of said second light sensor for modulating the light from said second light source such that the amount of light received by said second sensor varies in accordance with the angular position of said rotor element; said first and said second sensors providing electrical output signals which vary in accordance with the amount of light received and phase sensor means for determining the average phase relationship between said output from said first light sensor and said second light sensor for each complete revolution of said rotor elements and providing an output indication of the amount of rotation of said input element with respect to said stationary element.

2. Apparatus in accordance with claim 1 wherein said first and second modulating means each comprise an element having a plurality of alternately light transmissive and non-transmissive sectors identical to said sectors on said first and second rotor elements, each of said modulating means element having only a fraction of the number of sectors of each of said first and second rotor elements.

3. An electromechanical transducer comprising a pair of shaft encoders, each of said shaft encoders including a first element and a second element, each of said first elements being formed as a disc having a plurality of equiangular sectors circumferentially spaced around it, alternate ones of said sectors being light transmissive and light non-transmissive, said second element having a plurality of equiangular sectors alternately light transmissive and non-transmissive spaced on it, the number of said sectors on said second element being different from the number of sectors on said first element, each of said first elements being rotatable with respect to the associated one of said second elements, each of said shaft encoders including a pair of light sources and a pair of light sensors disposed on opposite sides of said elements and fixed to the second element, each of said light sources and light sensors being arranged such that when light transmitted from one of said sources to one of said sensors is at a maximum, the light transmitted from the second of said light sources to the second of said sensors is at a minimum, the second element of one of said shaft encoders being fixed to a mechanical reference point; drive means for rotating said first element of each of said shaft encoders at a substantially constant angular velocity with respect to said mechanical reference point and means connected to the output of each of said light sensors in said first and second shaft encoders for determining the phase relationship between output signals from said light sensors and said first shaft encoder and output signals from said light sensors and said second shaft encoder as indicative of the amount of rotation of said second element of said other shaft encoder with respect to said mechanical reference point.

4. Apparatus in accordance with claim 3 wherein said means for determining the phase relationship between the output signals from said first and said second sensor includes means for averaging the phase relationship between said outputs for one complete revolution of each of said first and said second rotatable elements.

5. Apparatus in accordance with claim 1 wherein said phase sensor means includes clock means providing an output signal at a selected frequency, said output signal being applied as a reference signal regulating the velocity of said drive means for rotating said first and second rotor elements; phase comparing means for continuously comparing the phase relationship between the output from said first light sensor and the output from said second light sensor and generating continuously a signal indicative of this phase relationship and means responsive to said clock means signal for sampling said phase comparing means signal at predetermined intervals.

6. An electromechanical transducer comprising first and second rotor elements, each of said rotor elements having a plurality of alternately light transmissive and non-transmissive sectors disposed in a circular path about a common axis of rotation, the radius of said circular path for each of said rotor element being equal; a stationary element in close juxtaposition to said first rotor element; an input element in close juxtaposition to said second rotor element; said input element being relatively rotatable with respect to said stationary element; drive means for rotating said first and second rotor elements at substantially constant angular velocity with respect to said stationary element; a first light source fixed to said stationary element on one side of said first rotor element and projecting light onto said first rotor element; a first light sensor mounted on said stationary element on the opposite side of said first rotor element and in a position to receive light from said first light source which is transmitted through said first rotor element; a modulating means fixed to said stationary element in the region of said first light source and said first light sensor for modulating light from said first light source such that the amount of light received by said first sensor varies in accordance with the angular position of said first rotor element, the operative portion of said modulating means being displaced from said common axis of rotation of said first and second rotor elements by a radial distance equal to the radial displacement of said rotor element circular paths; a second light source fixed to said input element on one side of said second rotor element and projecting light onto said second rotor element; a second light sensor mounted on said input element on the opposite side of said second rotor element from said second light source in a position to receive light from said second light source transmitted through said second rotor element; second modulating means mounted on said input element in the region of said second light sensor for modulating the light from said second light source such that the amount of light received by said second sensor varies in accordance with the angular position of said second rotor element, the operative portion of said second modulating means being displaced from said common axis of rotation of said rotor elements by a radial distance equal to the radial displacement of said circular paths on said rotor elements; said first and said second sensors providing electrical output signals which vary in accordance with the amount of light received and phase sensor means for determining the average phase relationship between said output from said first light sensor and said second light sensor for each complete revolution of said rotor elements and providing an output indication of the amount of rotation of said input element with respect to said stationary element.

7. Apparatus in accordance with claim 6 wherein said first and second modulating means each include an element having a plurality of alternately light transmissive and non-transmissive sectors identical to said sectors on said first and second rotor elements, each of said modulating means elements having only a fraction of the number of sectors of each of said first and second rotor elements.

8. Apparatus in accordance with claim 7 wherein each of the sectors on said first and second modulating means are disposed in an arcuate path having a radius of curvature equal to the radius or curvature of said circular path on said first and second rotor elements.

No references cited.

RALPH G. NILSON, *Primary Examiner.*

A. ABRAMSON, *Assistant Examiner.*